L. D. JOHNSON AND E. J. BIEDENKOPF.
SKID CHAIN FASTENER FOR MOTOR VEHICLES.
APPLICATION FILED JAN. 3, 1919.

1,342,631.

Patented June 8, 1920.

Witnesses
Guy M. Spring
S. M. McColl

Inventor
Louis D. Johnson
Edward J. Biedenkopf.
By Richard Owen
Attorney

UNITED STATES PATENT OFFICE.

LOUIS D. JOHNSON AND EDWARD J. BIEDENKOPF, OF BLUE ISLAND, ILLINOIS.

SKID-CHAIN FASTENER FOR MOTOR-VEHICLES.

1,342,631. Specification of Letters Patent. Patented June 8, 1920.

Application filed January 3, 1919. Serial No. 269,416.

*To all whom it may concern:*

Be it known that we, LOUIS D. JOHNSON and EDWARD J. BIEDENKOPF, citizens of the United States, residing at Blue Island, in the county of Cook and State of Illinois, have invented certain new and useful Improvements in Skid-Chain Fasteners for Motor-Vehicles, of which the following is a specification.

This invention relates to skid chain fasteners for motor vehicles.

The object of the invention is to provide a fastener of this character having a spring lock for securing the chain to prevent possible loss and which may be quickly released to permit the removal and application of a chain.

Another object is to provide a simple, cheap and efficient device of this character, the chain being detachable and the fastening member carried permanently by the wheel.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
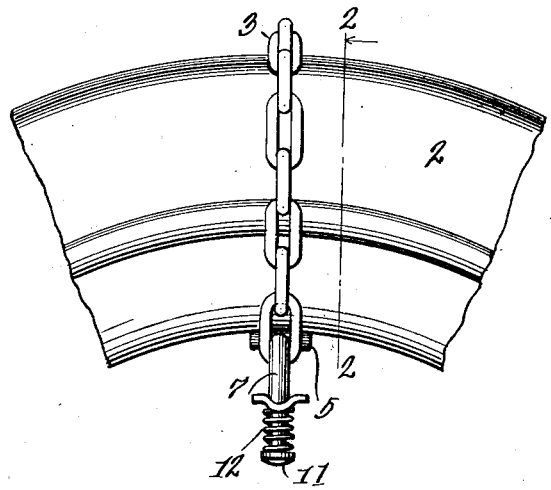
Figure 2:
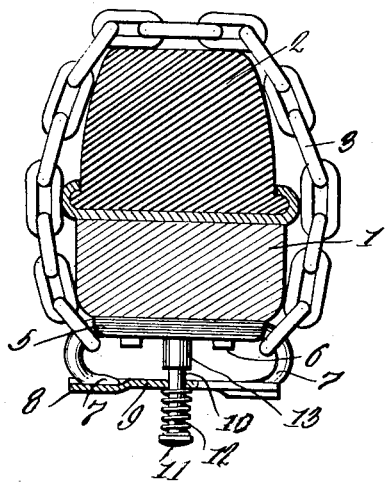

Figure 1 represents a side elevation of a portion of a wheel equipped with this improved fastener, a chain being shown secured thereto, and Fig. 2 is a transverse section taken on the line 2—2 of Fig. 1.

In the embodiment illustrated, the device constituting this invention is shown applied to a wheel having the usual rim or felly 1 with a solid tire 2 mounted thereon, said tire being preferably composed of rubber. While the device is shown applied to a solid tired wheel, obviously it may be used equally well on a pneumatic tire.

The fastener constituting this invention comprises a plate 5 designed to be secured to the inner face of the rim 1 by bolts 6 as shown clearly in Fig. 2 and extends transversely of the rim, being provided at its opposite ends with reduced rod-like extensions midway the width of said plate, said extensions being inturned to form hook-shaped members 7 with which the chain 3 is designed to be engaged, said chain spanning the tire and rim as shown clearly in the drawings and its outer ends engaged one with one hook and the other with the other. Extending outwardly from the plate 5 is a pin 10 having a head 11 at its free end and an enlarged inner end or base 13 with a plate 9 arranged on said pin and slidable in relation thereto. This plate 9 has seats 8 in its opposite ends in which are designed to be seated the hook-shaped terminals 7 of the member 5. A coiled spring 12 is arranged on said pin above the head 11 and the plate 9 and exerts its tension to normally hold said plate engaged with the hook 7. It will thus be seen that when this plate is so engaged the chain will be retained in operative position and yet will be freely removed when desired by moving the plate outwardly against the tension of spring 12.

Any desired number of these fasteners may be applied to a wheel, one only being here shown, but obviously a plurality must be used.

From the foregoing description, taken in connection with the accompanying drawings, the advantages of the construction and of the method of operation will be readily apparent to those skilled in the art to which the invention appertains and while we have described the principle of operation of the invention together with the device which we now consider to be the best embodiment thereof, we desire to have it understood that the device shown is merely illustrative and that such changes may be made as are within the scope of the claimed invention.

Having thus fully described our invention, what we claim as new and desire to secure by Letters Patent, is:—

A skid chain fastener comprising a plate of a length to extend transversely of the wheel rim to which it is to be applied and adapted to lie flat against the inner face of the rim, said plate being provided at its ends with inturned hook-shaped rod-like extensions, said extensions emanating from said plate midway its width whereby shoulders are formed at the base of the hooks to provide chain abutments, a pin extending outwardly from said plate between said hooks and having a reduced extension in advance of the plane occupied by the ends of said hooks, said pin having a head on its free end, a bar slidable on said pin with longitudinally extending seats on the inner face of the ends thereof to receive the bills of said hooks, said seats operating to prevent the lateral displacement of the bar relatively to the hooks, and a coiled spring mounted on said pin outside said bar to exert its tension to hold the bar yieldably engaged with the hooks.

In testimony whereof we affix our signatures in presence of two witnesses.

LOUIS D. JOHNSON.
EDWARD J. BIEDENKOPF.

Witnesses:
   DAN CHAMBERLAIN,
   JESSE H. LYNCH.